United States Patent
Emas

(10) Patent No.: US 11,385,006 B2
(45) Date of Patent: Jul. 12, 2022

(54) FIREARM DISCHARGE PREVENTION SYSTEM AND METHOD

(71) Applicant: Ellen Marcie Emas, Silver Spring, MD (US)

(72) Inventor: Ellen Marcie Emas, Silver Spring, MD (US)

(*) Notice: Subject to any disclaimer, the term of this patent is extended or adjusted under 35 U.S.C. 154(b) by 119 days.

(21) Appl. No.: 16/280,008

(22) Filed: Feb. 19, 2019

(65) Prior Publication Data

US 2019/0271516 A1    Sep. 5, 2019

Related U.S. Application Data

(60) Provisional application No. 62/637,468, filed on Mar. 2, 2018.

(51) Int. Cl.
| | | |
|---|---|---|
| *F41A 17/06* | (2006.01) | |
| *G08B 21/02* | (2006.01) | |
| *F41A 17/30* | (2006.01) | |
| *G06V 40/10* | (2022.01) | |

(52) U.S. Cl.
CPC ............ *F41A 17/063* (2013.01); *F41A 17/30* (2013.01); *G06V 40/10* (2022.01); *G08B 21/02* (2013.01)

(58) Field of Classification Search
CPC ........ F41A 17/063; F41A 17/30; F41A 17/06; F41A 17/08; F41A 19/10; G08B 21/02; G08B 13/19; G08B 25/10; G06K 9/00362
USPC .................. 42/69.01, 70.01–70.11
See application file for complete search history.

(56) References Cited

U.S. PATENT DOCUMENTS

| | | | | |
|---|---|---|---|---|
| 4,563,827 A * | 1/1986 | Heltzel | ................. | F41A 17/063 42/70.01 |
| 5,423,143 A * | 6/1995 | Martin | ..................... | F41A 17/06 42/106 |
| 5,448,847 A * | 9/1995 | Teetzel | .................. | F41A 17/066 42/70.05 |
| 5,564,211 A * | 10/1996 | Mossberg | ............... | F41A 17/08 42/70.01 |
| 5,715,623 A * | 2/1998 | Mackey, III | ............ | F41A 17/06 42/1.01 |
| 5,953,844 A * | 9/1999 | Harling | .................. | F41A 17/063 42/70.06 |
| 6,223,461 B1 * | 5/2001 | Mardirossian | .......... | F41A 17/06 42/70.11 |
| 6,293,039 B1 * | 9/2001 | Fuchs | ..................... | F41A 17/04 42/70.04 |
| 6,301,815 B1 * | 10/2001 | Sliwa | ..................... | F41A 17/066 42/70.01 |
| 6,345,461 B1 * | 2/2002 | Constant | ................. | F41A 17/04 42/70.11 |
| 6,415,542 B1 * | 7/2002 | Bates | ...................... | F41A 17/06 42/70.05 |
| 6,735,897 B1 * | 5/2004 | Schmitter | ............. | F41A 17/063 42/70.01 |
| 6,823,621 B2 * | 11/2004 | Gotfried | ............... | F41A 17/066 42/70.01 |
| 8,966,797 B2 * | 3/2015 | Carlson | ................. | F41A 17/063 42/1.01 |
| 9,032,656 B2 * | 5/2015 | Lupher | ................... | F41A 17/46 42/69.01 |

(Continued)

*Primary Examiner* — Michael D David

(57) ABSTRACT

A firearm is prevented from firing when a human being detection system detects a person is within the range of the firearm by maintaining a trigger mechanism and/or projectile loading mechanism in an inoperable state.

20 Claims, 4 Drawing Sheets

(56) References Cited

U.S. PATENT DOCUMENTS

| | | | |
|---|---|---|---|
| 9,656,162 B2* | 5/2017 | Polzin | G06K 9/00624 |
| 9,797,769 B2* | 10/2017 | Herrera Stromberg | |
| | | | G01J 5/0806 |
| 9,810,497 B2* | 11/2017 | Carlson | F41A 3/66 |
| 9,841,249 B1* | 12/2017 | Nicks | H02J 7/00045 |
| 9,854,207 B2* | 12/2017 | Garrett | H04N 7/18 |
| 9,858,496 B2* | 1/2018 | Sun | G06K 9/3233 |
| 10,816,293 B2* | 10/2020 | Nieh | F41A 17/063 |
| 2002/0170220 A1* | 11/2002 | Recce | B60R 25/2045 |
| | | | 42/70.08 |
| 2002/0178635 A1* | 12/2002 | Martin | F41A 17/06 |
| | | | 42/70.11 |
| 2005/0141997 A1* | 6/2005 | Rast | F04D 27/008 |
| | | | 416/229 R |
| 2005/0229654 A1* | 10/2005 | Victor | F41A 17/066 |
| | | | 70/58 |
| 2006/0208857 A1* | 9/2006 | Wong | F41C 33/029 |
| | | | 340/5.82 |
| 2007/0126576 A1* | 6/2007 | Script | G08B 19/005 |
| | | | 340/545.5 |
| 2008/0204251 A1* | 8/2008 | Hudson | F41A 17/06 |
| | | | 340/573.1 |
| 2010/0321186 A1* | 12/2010 | Crook | G08B 25/10 |
| | | | 340/568.6 |
| 2011/0063102 A1* | 3/2011 | Ivtsenkov | F41A 17/08 |
| | | | 340/505 |
| 2013/0009771 A1* | 1/2013 | Simon | G08B 25/10 |
| | | | 340/539.1 |
| 2013/0019512 A1* | 1/2013 | Kemmerer | F41A 17/066 |
| | | | 42/70.05 |
| 2013/0300566 A1* | 11/2013 | Kumfer | G08B 25/08 |
| | | | 340/686.6 |
| 2013/0318847 A1* | 12/2013 | Kelly | F41A 17/46 |
| | | | 42/70.06 |
| 2014/0028856 A1* | 1/2014 | Ehrlich | F41G 3/12 |
| | | | 348/169 |
| 2016/0169605 A1* | 6/2016 | Courtot | F41A 17/46 |
| | | | 42/70.06 |

* cited by examiner

FIREARM DISCHARGE PREVENTION SYSTEM AND METHOD

CROSS REFERENCE

This application claims priority from provisional application Ser. No. 62/637,468 filed Mar. 2, 2018.

BACKGROUND OF THE INVENTION

Discharge from a firearm, whether intentional or unintentional, is a major hazard to humans that needs to be addressed. There is an urgent need to prevent discharge of a firearm when aimed in the direction of a human being.

Security and surveillance systems for residential or commercial establishments are well known. These systems monitor an area to detect objects, and human and nonhuman intruders using various types of sensors (U.S. Pat. Nos. 9,854,207, 9,797,769).

Computer game devices also monitor movement of humans and objects within a location. (U.S. Pat. Nos. 9,656,162, 9,858,496).

Firearms have been designed to prevent discharge by locking the trigger mechanism and/or locking the projectile loading mechanism. For example, a trigger assembly can be configured to disengage a firing mechanism or a projectile loading mechanism can be configured to prevent projectile loading (U.S. Pat. Nos. 9,032,656, 9,810,497, 9,841,249).

Heretofore (a) object/human location or detection systems and (b) firearm discharge prevention systems have never been combined. The combination thereof will prevent a firearm from discharging a projectile when a human being is in the path of the projectile fired from the firearm thereby preventing a human being from being killed or injured.

SUMMARY OF THE INVENTION

The present invention is directed to preventing a firearm from firing when a sensor detects a person is within a predetermined area of the line of sight of the firearm. The firearm is prevented from firing by maintaining the trigger mechanism and/or the projectile loading mechanism in an inoperable state.

DETAILED DESCRIPTION OF THE INVENTION

Figure 1:
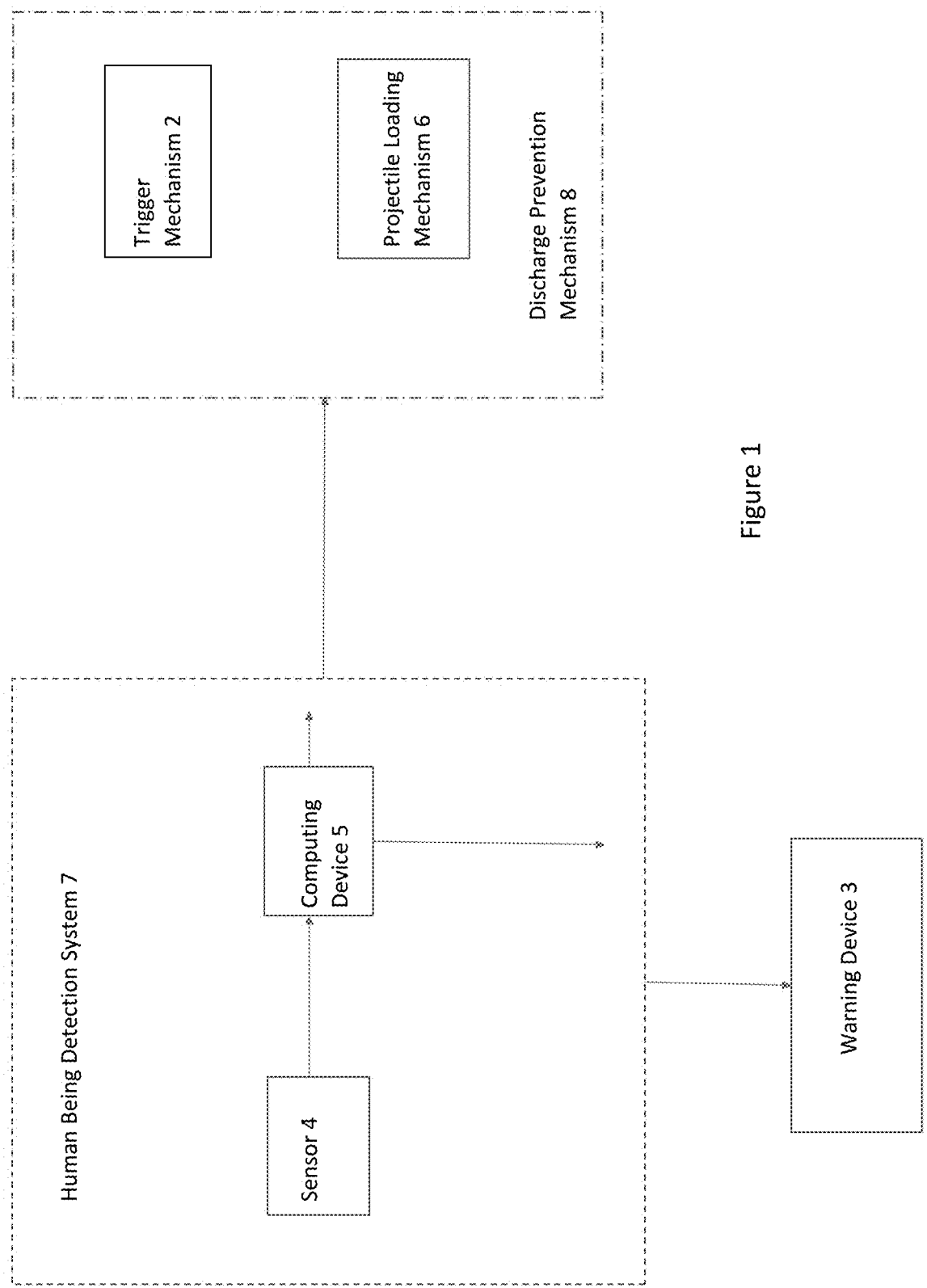
FIG. 1 shows block diagram showing a system according to the present invention.
Figure 2:
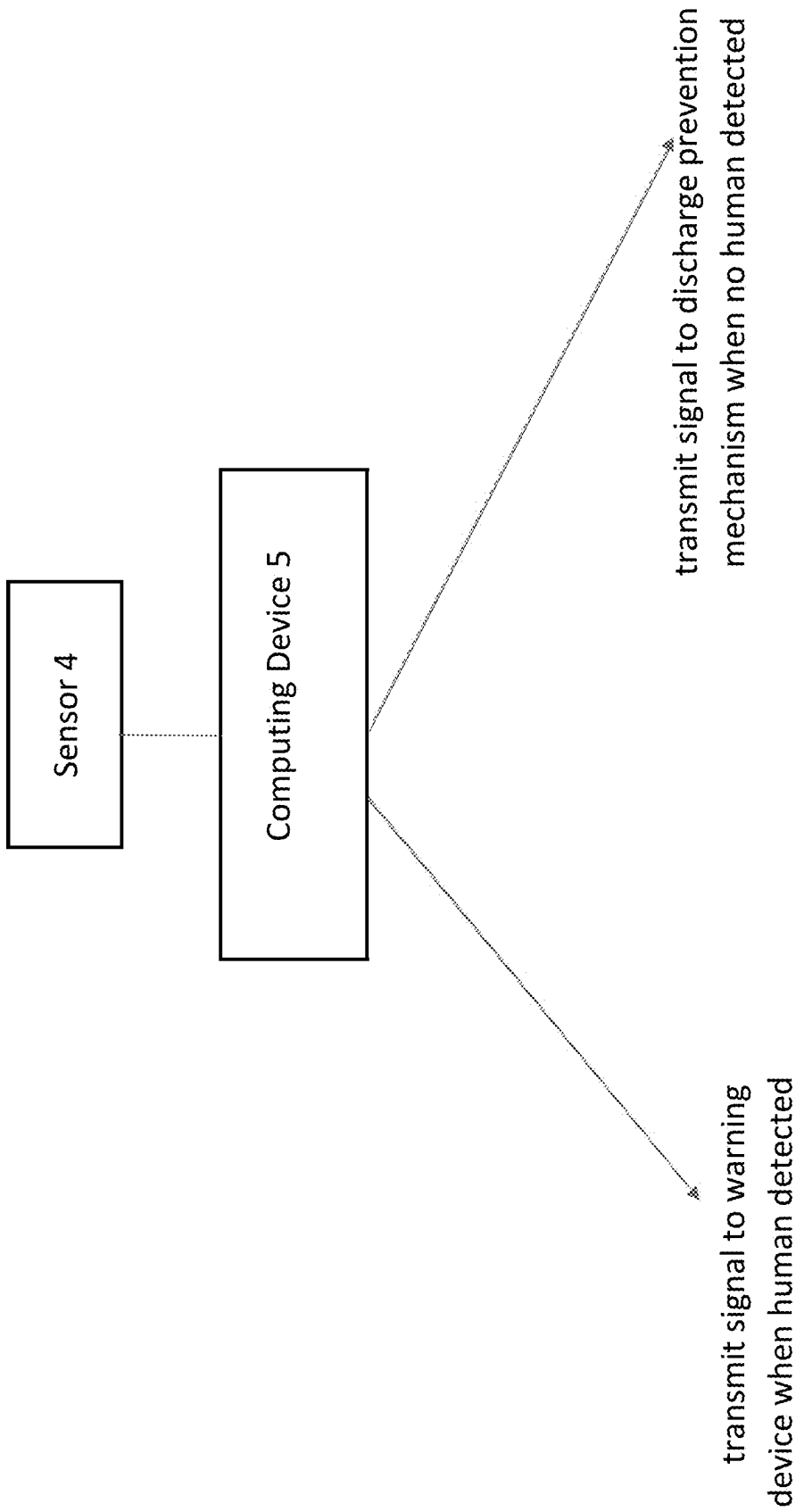
FIG. 2 shows a block diagram of the function of the present invention.
Figure 3:
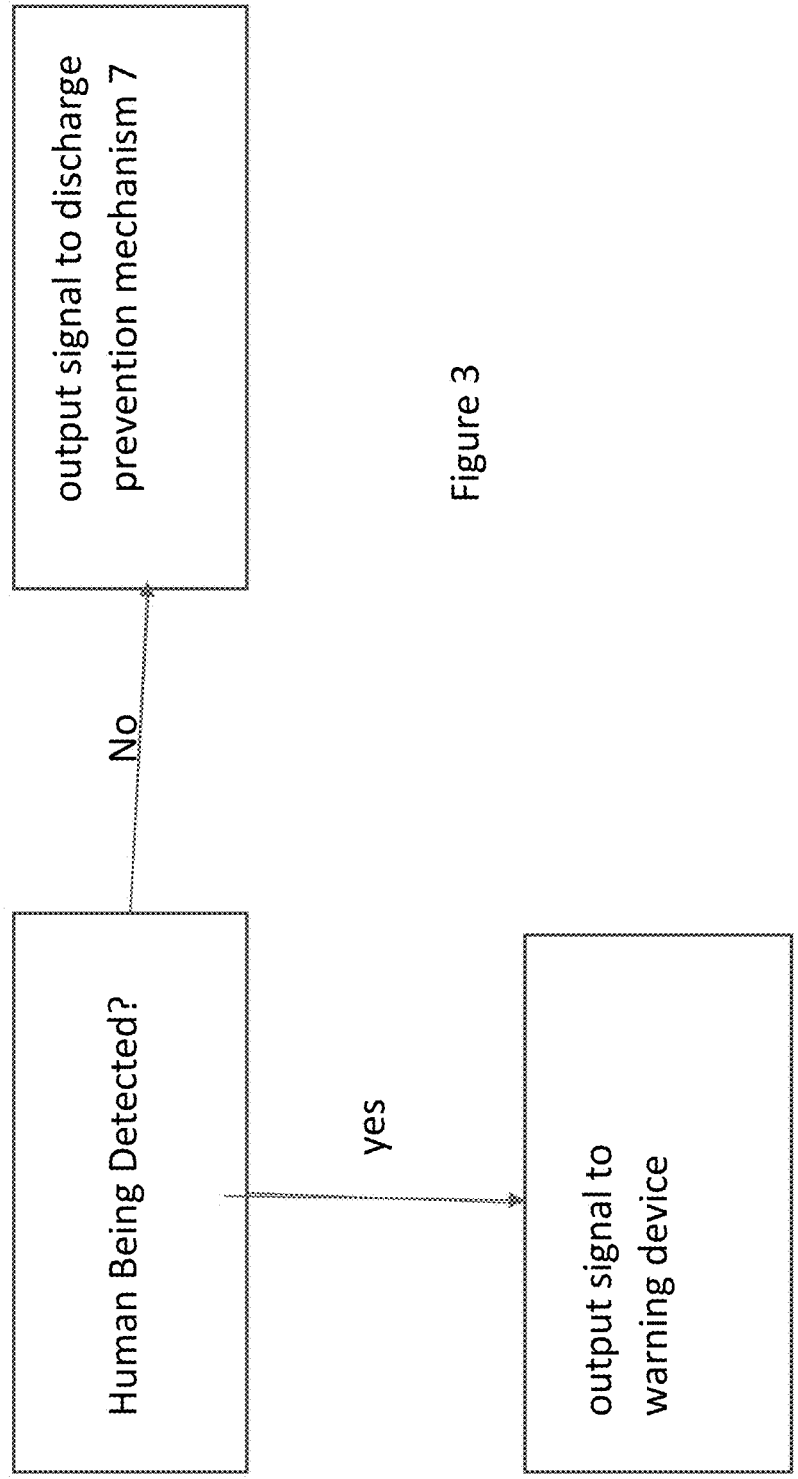
FIG. 3 shows a block diagram of a method of the present invention.

As shown in FIG. 1, a firearm discharge prevention system 1 includes a trigger mechanism 2 of a firearm, a sensor 4, a projectile loading mechanism 6 of the firearm, a computing device 5 and a warning device 3. The trigger mechanism 2 is maintained in an inoperable position or state. The sensor 4 is mounted on or in a vicinity of the firearm such that the sensor 4 can obtain data surrounding a line of sight of the firearm, including data related to human being(s) in the line of sight and surroundings thereof. The data from the sensor 4 is sent to the computing device 5 (FIGS. 1, 2 and 3).

Figure 4:
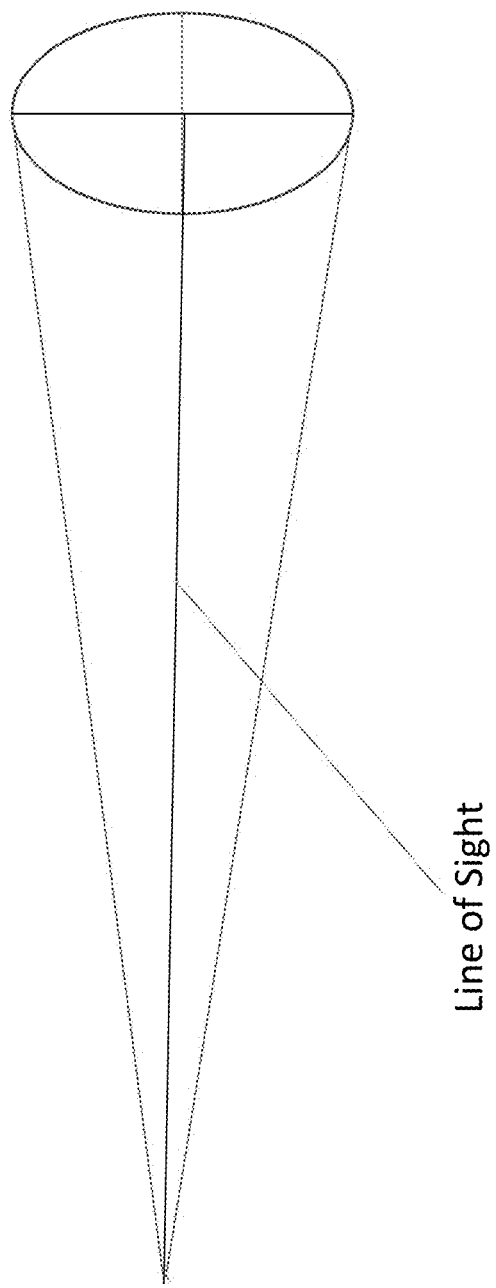
FIG. 4 shows an area of danger.

The computing device 5 may be provided inside the sensor 4 or outside the sensor but in association therewith. The computing device 5 determines if at least one human being is within the line of sight of the firearm or within a predetermined range, depth and angle surrounding the line of sight or within a predetermined area surrounding the line of sight (i.e. parameters for an area or a cone of danger, FIG. 4). The computing device 5 can also determine a rate of approach to the line of sight or area surrounding the line of sight. If a human being is determined to be within the line of sight or the parameters surrounding the line of sight, no signal is sent by the computing device 5 to the trigger mechanism 2 so that the trigger mechanism 2 remains in the inoperable state, thus preventing the firearm from discharging a projectile (FIG. 3). Additionally, the computing device 5 will prevent discharge of the firearm when someone, who is outside of the line of sight, is rapidly approaching the area of danger. However, if no human is within the line of sight or the parameters surrounding the line of sight or rapidly approaching the line of sight or area of danger, the computing device 5 sends a signal to the trigger mechanism 2 to place the trigger mechanism 2 in an operable state so that the firearm can be operated to fire a projectile i.e. a trigger or a striker can operate (FIG. 3). It should be noted that the line of sight and the parameters (i.e. range, angle and depth) surrounding the line of sight will vary depending on the type of firearm, therefore no specific limitations are stated herein. The sensor 4 and computing device 5 form a human being detection system 7.

The projectile loading mechanism 6, which loads a projectile into a firing chamber of the firearm, is also maintained in an inoperable state. The signal from the computing device 5 is also sent to the projectile loading mechanism 6 to allow the projectile loading mechanism 6 to operate such that a projectile can be loaded into the firing chamber of the firearm when no human being is determined to be in the line of sight of the firearm or the area surrounding the line of sight. The trigger mechanism 2 and the projectile loading mechanism 6 form a discharge prevention mechanism 8. The discharge prevention mechanism maintains the firearm in an inoperable state when no signal is received from the computing device 5. In other words, when a human being is determined to be in the line of sight or in the area surrounding the line of sight or rapidly approaching, no signal is sent to the discharge prevention mechanism by the computing device 5. Therefor, the trigger mechanism 2, the projectile loading mechanism 6 or both the trigger mechanism and the projectile loading mechanism 6 remain in the inoperable state preventing the firearm from firing.

The firearm may be of any caliber, gauge or action including single action, double action, bolt, pump, lever, automatic or semiautomatic action. The firearm may be a military style assault weapon, a rifle, pistol, shotgun, carbine, revolver, machine gun, submachine gun, pellet gun, or heavy machine gun, Gatling gun, or the like. Such guns or weapons can be handheld, ground-based, mounted on a vehicle, mounted on a drone, or the like. Projectiles may be bullets, shells, shot, slugs, cartridges, munitions or any type of ammunition.

The computing device 5 can be a microprocessor, smartphone, wearable computer, laptop computer, tablet computer, PDA (personal data assistant) or the like. The computing device 5, if not included in the sensor 4 or not connected to the sensor 4, trigger mechanism 2 and/or projectile loading mechanism 6, can be operable to communicate with the sensor 4, trigger mechanism 2 and projectile loading system 6 via Bluetooth, Wi-Fi, a cellular network, a satellite network and/or a near-field network. The communication between the sensor 4, computing device 5, trigger mechanism 2 and projectile loading mechanism 6 may be encrypted.

The sensor 4 may be a single sensor or a sensor array of two or more sensors of the same type or of different types. The sensor 4 may be any type of sensor that can be used to detect the presence of a human being such as a passive infrared sensor (PIR), thermal sensor, motion sensor, camera or any other type of sensor used for detection already known in the art or developed hereinafter. The computing device 5 manipulates the data output by the sensor 4 to determine if a human being is present in the line of sight or within the angle, range or depth surrounding the line of sight or rapidly approaching the line of sight. For example, the computing device 5 may determine a human being is present based on algorithms for recognition of a human face, thermal image or temperature, human form or shape, speed of movement, shape matching or pattern matching, or a combination thereof. The method, devices or means for determining the presence of a human is not limited, and can be any method, device or means already known in the art or developed hereafter.

The sensor 4 and computing device 5 are powered by a power source such as a battery which may be replaceable or rechargeable. The trigger mechanism 2 and projectile loading mechanism 6 may be powered by the power source or may be mechanical devices. When the power is turned off, via a switch or other device, or when the battery is not operating or is depleted, the sensor 4 and computing device 5 do not operate. Thus, the trigger mechanism 2 and the projectile loading mechanism 6 remain inoperable since no activation signal is received from the computing device 5. Similarly, if the sensor 4 is intentionally blocked or disabled, no data is sent to the computing device 5. Since the computing device 5 receives no data from the sensor 4, no signal is sent from the computing device 5 to the trigger mechanism 2 and/or the projectile loading mechanism 6. Therefore, the mechanisms 2,6 remain in an inoperable state. Additionally, the computing device 5 and/or sensor 4 may include a timer such that the computing device 5 and/or the sensor 4 will go into a sleep state or turn off to prevent power or battery drain.

The sensor 4 may include a distance sensor or proximity sensor which transmits distance information about the distance from the firearm to a target object in the line of sight or surrounding the line of sight of the firearm. The distance information is transmitted from the sensor 4 to the computing device 5. Thus, if the computing device 5 determines that the firearm is less than a predetermined close distance from an object, the computing device 5 does not send a signal to the trigger mechanism 2 and/or projectile loading mechanism 6. The mechanisms 2,6 are thus maintained in the inoperable state to prevent accidental discharge of the firearm at a close or pointblank range or at a range that the sensor 4 has no line of sight or cannot obtain accurate distance information. The predetermined close distance will vary depending on the type of firearm, therefor no specific limitations are stated herein.

The trigger mechanism 2 may operate in various manners depending upon the type of firearm being utilized, such as a pistol, rifle, etc. The trigger mechanism 2 may be made inoperable by any already known trigger blocking devices. The trigger blocking device may be of any appropriate shape, size, type or configuration, such as a bar, L-shaped bar, solenoid and the like, depending upon the location of the trigger mechanism 2 in the selected type of firearm. The trigger mechanism 2 may be made inoperable such as having a bar which prevents a trigger from depressing, or a striker from actuating to render the firearm inoperable. When the trigger mechanism 2 receives a signal from the computing device 5, indicating no human being is present, the trigger blocking device is actuated or deactivated to allow the trigger mechanism 2 to operate to fire a projectile. The configuration of the trigger mechanism 2 is not limited and can be any mechanism already known in the art or developed hereafter based on the type of firearm it is associated therewith.

The projectile loading mechanism 6 is prevented from feeding projectiles into the firing chamber of the firearm when a signal is not received from the computing device 5, thereby rendering the firearm incapable of loading projectiles. A lock or blocking device may be in any appropriate location on the projectile loading mechanism 6, depending on the type of firearm, to prevent feeding of projectiles into the firing chamber of the firearm, thereby rendering the firearm inoperable. The configuration of the projectile loading mechanism 6 is not limited and can be any mechanism already known in the art or developed hereafter based on the type of firearm it is associated therewith.

When the computing device 5 determines that a human being is within the line of sight of the firearm or within the area surrounding the line of sight, the computing device 5 will output a signal to a warning device 3 to warn the user, of the firearm, that a human is in the line of sight or within the parameters of the line of sight. The warning device 3 can be a visual device (example, warning light), audible device or tactile device (example, vibration). The warning device 3 may be placed on the firearm itself, be part of the computing device 5 or a device separate from the firearm. The warning device 3 may be directly connected to the computing device 5 or may communicate via Wi-Fi, Bluetooth, a cellular network, a satellite network and/or a near-field network with the computing device.

The combination of the sensor 4 and computing device 5 may be retrofitted to an existing firearm that already has a trigger locking system or blocking projectile loading system.

The present invention is directed to preventing human beings from harm due to hazardous use of firearm. Since the firearm is only prevented from firing when a human being is within a line of sight or parameters thereof of the firearm, hunters will still be able to hunt animals such as deer, etc. Additionally, people who enjoy target shooting will still be able to practice shooting at inanimate objects. In addition, by having different types of sensors and computing devices provided for different types of firearms, firearms can be set up to only allow shooting at inanimate targets or objects, while other firearms can be set up to only allow hunting of different types of animals. For example, if only target shooting is desired, the sensor 4 and computing device 5 will not discharge if any living animal is within the line of sight or parameters of the line of sight of the firearm. Alternatively, the computing device 5 and/or sensor 4 may have a switch or other device or method to allow a user to switch between a hunting mode and a target shooting mode.

The present invention is not limited to these embodiments, but various variations and modifications may be made without departing from the spirit and scope of the present invention.

What is claimed is:

1. A firearm discharge prevention system comprising:
a human being detection system determines presence of any human being within a predetermined area of a line of sight of a firearm, the human being detection system including at least one sensor and a computing device; and
a discharge prevention mechanism prevents discharge of the firearm only when the human being detection system determines a human being is within the predetermined area and allows discharge of the firearm for animals and inanimate objects, wherein the discharge prevention mechanism includes at least one of a trigger mechanism or a projectile loading mechanism, each maintained in an inoperable state when presence of any human being is determined.

2. The firearm discharge prevention system according to claim 1, wherein the discharge prevention mechanism includes the trigger mechanism which is maintained in the inoperable state when presence of any human being is determined.

3. The firearm discharge prevention system according to claim 1, wherein the discharge prevention mechanism includes the projectile loading mechanism which is maintained in the inoperable state when presence of any human being is determined.

4. The firearm discharge prevention system according to claim 1, wherein the discharge prevention mechanism includes the trigger mechanism and the projectile loading mechanism which are maintained in the inoperable state when presence of any human being is determined.

5. The firearm discharge prevention system according to claim 1, wherein the at least one sensor includes an array of sensors.

6. The firearm discharge prevention system according to claim 5, wherein the array of sensors are of different types.

7. The firearm discharge prevention system according to claim 5, wherein the array of sensors are of a same type.

8. The firearm discharge prevention system according to claim 1, further comprising a warning device, which outputs a warning when the human being detection system detects a human being within the predetermined area.

9. The firearm discharge prevention system according to claim 8, wherein the warning device outputs a visual warning.

10. The firearm discharge prevention system according to claim 8, wherein the warning device outputs an audible warning.

11. The firearm discharge prevention system according to claim 8, wherein the warning device outputs a tactile warning.

12. The firearm discharge prevention system according to claim 5, wherein the at least one sensor includes a proximity sensor which outputs distance information between the firearm and an object or human being.

13. The firearm discharge prevention system according to claim 12, wherein the discharge prevention mechanism is maintained in an inoperable state when the computing device determines the distance information from the at least one sensor is a predetermined close distance.

14. A firearm discharge prevention method comprising the steps of:
determining presence of any human being within a predetermined area of a line of sight of a firearm via a computing device and at least one sensor; and
preventing discharge of the firearm only when presence of a human being is determined to be within the predetermined area and allowing discharge of the firearm for animals and inanimate objects via at least one of a trigger mechanism or a projectile loading mechanism.

15. The firearm discharge prevention method according to claim 14, further comprising the step of maintaining the trigger mechanism in an inoperable state when presence of any human being is determined.

16. The firearm discharge prevention method according to claim 14, further comprising the step of maintaining the projectile loading mechanism in an inoperable state when presence of any human being is determined.

17. The firearm discharge prevention method according to claim 14, further comprising the step of maintain the trigger mechanism and the projectile loading mechanism in an inoperable state when presence of any human being is determined.

18. The firearm discharge prevention method according to claim 14, further comprising the step of outputting a warning when presence of any human being is determined to be within the predetermined area.

19. The firearm discharge prevention method according to claim 14, further comprising the step of maintaining the firearm in an inoperable state when a distance between the firearm and an object or human being is a predetermined close distance.

20. The firearm discharge prevention method according to claim 14, further comprising of step of the at least one sensor being a plurality of sensors of one of a same type or different types.

* * * * *